United States Patent
Kurupacheril et al.

(10) Patent No.: US 9,131,017 B2
(45) Date of Patent: Sep. 8, 2015

(54) MEETING UPDATE DISSEMINATION IN A REAL-TIME COMMUNICATION SYSTEM

(71) Applicant: FutureWei Technologies, Inc., Plano, TX (US)

(72) Inventors: Francis Kurupacheril, Cupertino, CA (US); Dennis Episkopos, Westminster, CO (US)

(73) Assignee: Futurewei Technologies, Inc., Plano, TX (US)

( * ) Notice: Subject to any disclaimer, the term of this patent is extended or adjusted under 35 U.S.C. 154(b) by 176 days.

(21) Appl. No.: 13/791,451

(22) Filed: Mar. 8, 2013

(65) Prior Publication Data

US 2014/0258416 A1 Sep. 11, 2014

(51) Int. Cl.
*H04L 29/06* (2006.01)

(52) U.S. Cl.
CPC .................. *H04L 65/4023* (2013.01)

(58) Field of Classification Search
CPC .................................. H04L 65/4023
USPC ......................... 709/205, 204, 206
See application file for complete search history.

(56) References Cited

U.S. PATENT DOCUMENTS

| | | | |
|---|---|---|---|
| 2009/0327893 A1* | 12/2009 | Terry et al. ..................... | 715/719 |
| 2011/0072362 A1* | 3/2011 | Denner et al. ................ | 715/751 |
| 2012/0162349 A1* | 6/2012 | Alexandrov et al. ...... | 348/14.03 |
| 2014/0066035 A1* | 3/2014 | Melin ........................... | 455/416 |

OTHER PUBLICATIONS

"Conference Scribe: Turning Conference Calls into Documents"—Wellner et al, MIT, Xenia Media, Jun. 2012 http://xenia.media.mit.edu/~barons/pdf/arons_HICSS01_conference_scribe.pdf.*

* cited by examiner

*Primary Examiner* — Randy Scott
(74) *Attorney, Agent, or Firm* — Slater & Matsil, L.L.P.

(57) ABSTRACT

System and methods for meeting update dissemination in a real-time communication system are provided. An embodiment method of disseminating updates in a real-time communications system includes storing, in a database, indicators received from a leader of a meeting, the indicators pertaining to predetermined topics to be discussed during the meeting, collecting, in the database, data from the meeting corresponding to the indicators while the meeting is in progress, receiving, at the database, an indication that a participant has joined the meeting after the meeting has begun, and alerting, by the database, the participant that the data that was collected before the participant joined the meeting is available to the participant for review during the meeting.

25 Claims, 9 Drawing Sheets

MEETING UPDATE DISSEMINATION IN A REAL-TIME COMMUNICATION SYSTEM

TECHNICAL FIELD

The present disclosure relates to communication systems and, in particular embodiments, to conferencing through communication systems.

BACKGROUND

In order to accommodate participants in different geographic locations, meetings may take place by conference using a communication system. For example, a meeting may be conducted by video conference, phone conference, web conference with desktop sharing, via chat sessions, using instant messaging, and so on.

Unfortunately, not all invited or expected meeting participants arrive on time for the meeting. In order to update those late-arriving participants, the meeting may have to be temporarily halted, which wastes time, leads to a loss of productivity, and reduces efficiency.

SUMMARY

An embodiment method of disseminating updates in a real-time communications system includes storing, in a database, indicators received from a leader of a meeting, the indicators pertaining to predetermined topics to be discussed during the meeting, collecting, in the database, data from the meeting corresponding to the indicators while the meeting is in progress, receiving, at the database, an indication that a participant has joined the meeting after the meeting has begun, and alerting, by the database, the participant that the data that was collected before the participant joined the meeting is available to the participant for review during the meeting.

An embodiment method of disseminating updates in a real-time communications system includes receiving, from a leader of a meeting, indicators pertaining to predetermined topics to be discussed during the meeting prior to the meeting starting, collecting, in a database, data from the meeting corresponding to the indicators while the meeting is in progress, receiving, at the database, an indication that a late-arriving participant has joined the meeting after the meeting has begun, and sending, to the late-arriving participant, the data from the meeting that was collected before the late-arriving participant joined the meeting for review by the late-arriving participant during the meeting.

An embodiment database in a real-time communications system includes a participant interface configured to receive indicators from a leader of a meeting, the indicators pertaining to predetermined topics to be discussed during the meeting, a memory operably coupled to the participant interface, the memory configured to store the indicators and to collect data from the meeting corresponding to the indicators while the meeting is in progress, and a late-arriving participant interface operably coupled to the memory, the late-arriving participant interface configured to alert a late-arriving participant that the data that was collected before the late-arriving participant joined the meeting is available to the late-arriving participant for review during the meeting.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a communications system. The concepts in the disclosure may also apply, however, to other types of systems, devices, components, and so on.

Figure 1:
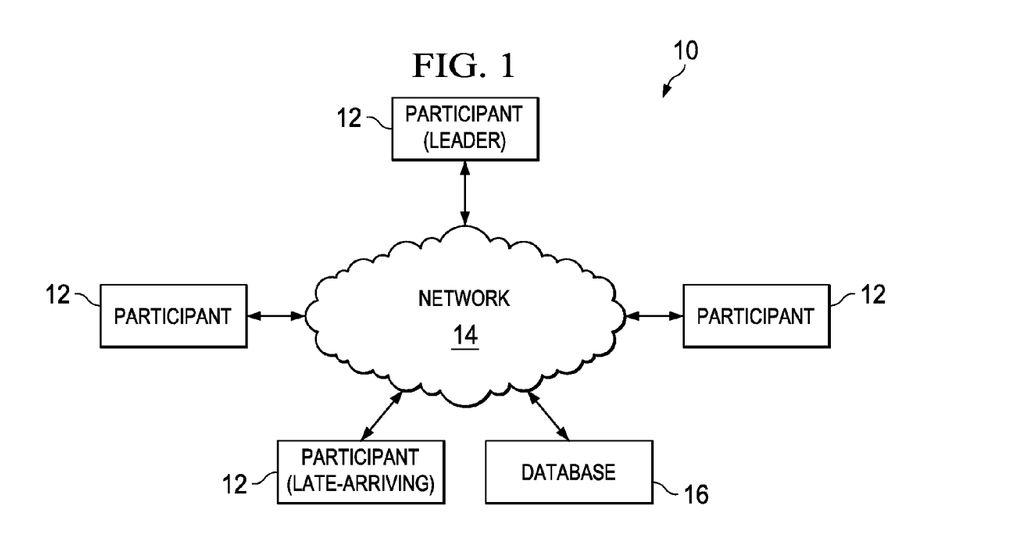
FIG. 1 illustrates an embodiment real-time communications system suitable for use in conducting a meeting by conference.

Referring now to FIG. 1, an embodiment real-time communications system 10 is illustrated. As shown, the embodiment real-time communications system 10 includes participants 12 communicating through a network 14 with a database 16. It should be recognized that practical applications of the embodiment real-time communications system 10 may include a variety of other components, devices, hardware, and so on, which have not be been included in FIG. 1 for ease of illustration.

As will be more fully explained below, a variety of different types of meetings may be conducted using the embodiment real-time communications system 10. For example, the embodiment real-time communications system 10 may be suitably equipped to support video conferences, phone conferences, web conferencing, web conferencing with desktop sharing, chat and/or instant messaging sessions, and so on. Indeed, the embodiment real-time communications system 10 may accommodate and permit any type of conferencing conducted over a network 14 and/or allowing participants 12 in different geographic locations to effectively communicate with one another.

The participants 12 depicted in FIG. 1 represent a user equipment (UE) being employed or utilized by a user. Examples of such user equipments (UEs) include, but are not limited to, a personal computer, tablet, smart phone, phone, and so on. While four of the participants 12 are illustrated in FIG. 1, it should be recognized that more or fewer of the participants 12 may be included in the embodiment real-time communications system 10.

As shown, one of the participants 12 in FIG. 1 is labeled as the leader. As used herein, the leader is generally the participant 12 that initiated, monitors, administrates, or otherwise manages a meeting being conducted by conference. While one of the participants 12 illustrated in FIG. 1 is labeled as the leader, it should be recognized that more of the participants 12 may have a leadership role in the embodiment real-time communications system 10.

In addition, one of the participants 12 in FIG. 1 is labeled as late-arriving. As used herein, the late-arriving participant is generally the participant 12 that joined the meeting after the meeting has already begun, after the scheduled time for the meeting has passed, and so on. While one of the participants 12 illustrated in FIG. 1 is labeled as late-arriving, it should be recognized that more of the participants 12 may be late-arriving in the embodiment real-time communications system 10.

The network 14 may be a Wide Area Network (WAN), (e.g., the Internet), a Local Area Network (LAN), a plain old telephone service (POTS), and so on. The network 14 may employ wired or wireless connections, or some combination thereof. In addition, the participants 12 may connect to the network 14 using wired or wireless connections, or some combination thereof.

The database 16 may be a server or other computing device. The database 16 may be local or remote relative to the participants 12. In other words, the database 16 may be a company database 16 located on site or a database in the cloud in a remote location. The database 16 is shown in further detail in FIG. 2. As shown, the database 16 includes a participant interface 18, a memory 20, and a late-arriving interface 22.

Figure 2:
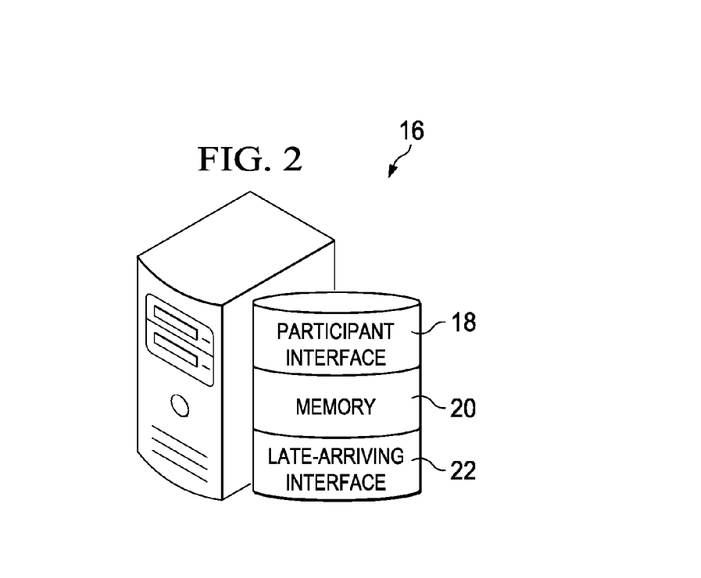
FIG. 2 illustrates a database from the embodiment real-time communications system of FIG. 1.

The participant interface 18 and the late-arriving participant interface 22 are generally operably coupled to the memory 20. As such, these components are able to exchange data and information with each other. The participant interface 18 and the late-arriving participant interface 22 may be implemented by software, hardware, firmware, or some combination thereof. The participant interface 18 is generally configured to receive indicators from the participant 12 who is a leader of the meeting. The participant interface 18 is also generally configured to have these indicators stored in the memory 20.

The late-arriving interface 22 is operably coupled to the memory 20. As will be more fully explained below, the late-arriving interface 22 is configured to alert the late-arriving participant 12 that the data that was collected before the late-arriving participant 12 joined the meeting is available to the late-arriving participant 12 for review during the meeting. The late-arriving interface 22 is also configured to send the data to the late-arriving participant 12 for review during the meeting.

The memory 20 is operably coupled to the participant interface 18. The memory 20 is configured to store the indicators and to collect data from the meeting corresponding to the indicators while the meeting is in progress. As used herein, the data from the meeting may be in the form of a video clip, an audio clip, text, a visual image, a chat log, an instant message log, and so on. In other words, in an embodiment the data may be any media or information being shared in any format between the participants 12 during the conference. In an embodiment, the memory 20 of the database 16 and/or a memory (not shown) in each of the participant 12 devices is also able to store all or a portion of the data.

In an embodiment, the memory 20 of the database 16 and/or a memory (not shown) in each of the participant 12 devices will store a conferencing application (e.g., Skype, eSpace, etc.). This conferencing application, which may be executed by one or more processors of the database 16 and/or the participants 12, is able to offer the functionality described herein. In other words, in an embodiment the capabilities disclosed herein are an intrinsic part of the conferencing application stored in and running on the database 16 and the participants 12 devices.

Figure 3:
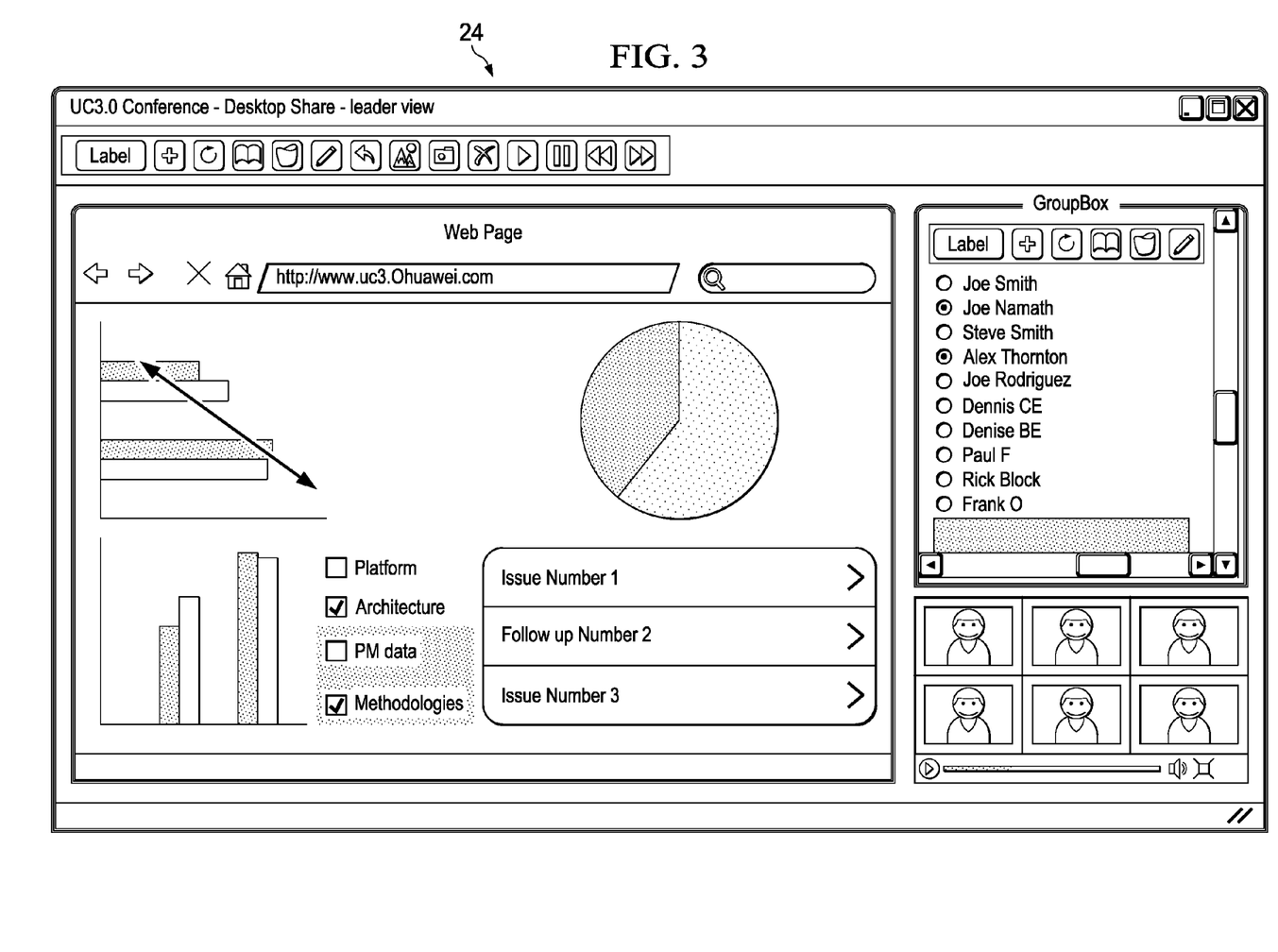
FIG. 3 illustrates a graphical user interface (GUI) that may be displayed for the participant who is the leader of the meeting being held via video conference.

Referring now to FIG. 3, a graphical user interface (GUI) 24 that may be displayed for the participant 12 who is the leader of the meeting being held via video conference is illustrated. In this example, the meeting is being conducted using some type of video conferencing or voice over Internet protocol (VoIP). As shown, the graphical user interface 24 displayed for the leader participant 12 includes, for example, a webpage, charts, group members, video feeds for participants, desktop sharing, group chats, and so on.

Figure 4:
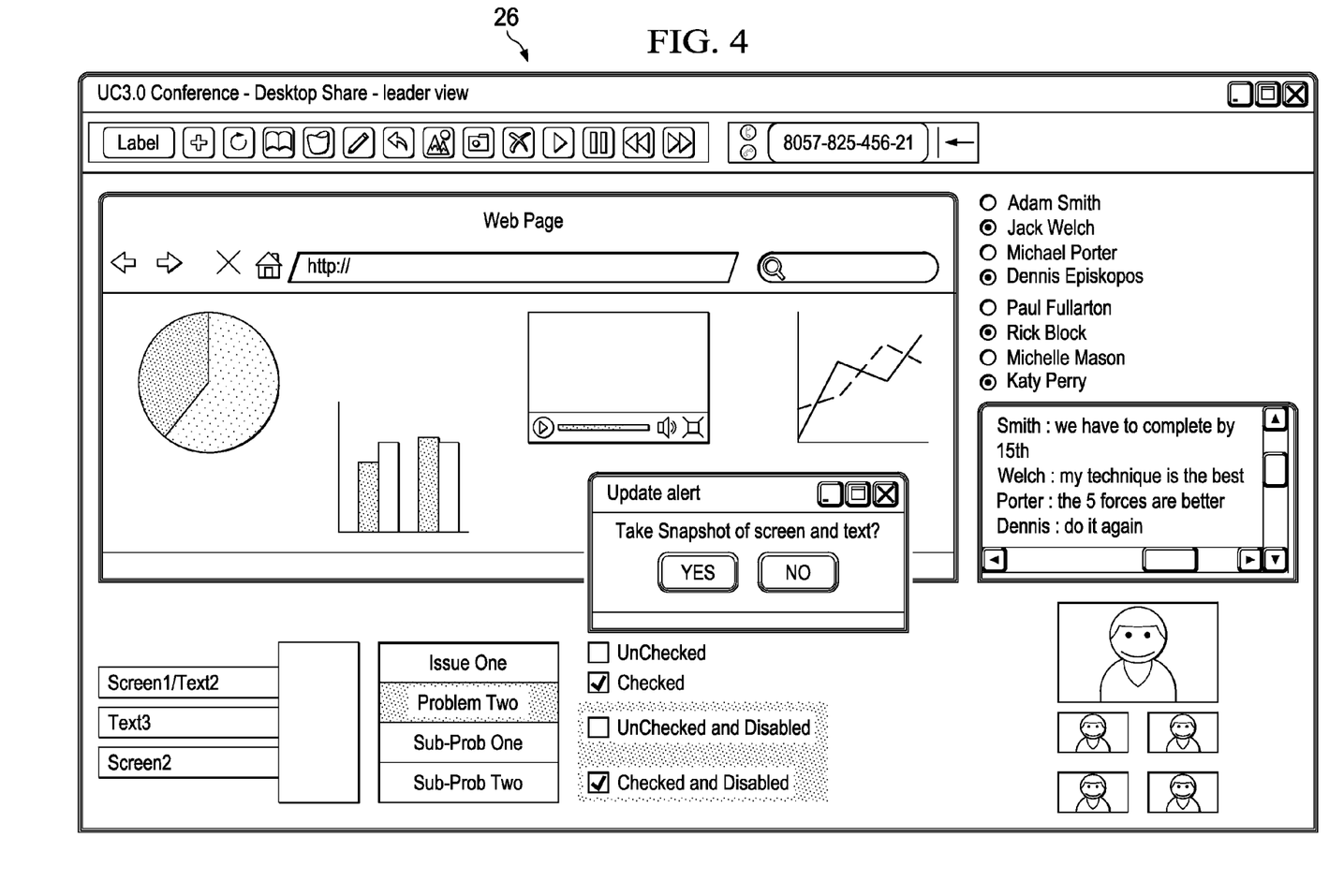
FIG. 4 illustrates a graphical user interface (GUI) the participant who is the leader of the meeting to determine if a snapshot of the screen and text is desired.

Referring now to FIG. 4, a graphical user interface (GUI) 26 is shown prompting the participant 12 who is the leader of the meeting to determine if a snapshot of the screen and text is desired. If the leader participant 12 decides to capture this data, the data is saved at the database 16 for future review by late-arriving participants 12. Notably, the graphical user interface 26 in FIG. 4 includes a chat or instant message log as well as other meeting subject matter, which can also be captured.

Figure 5:
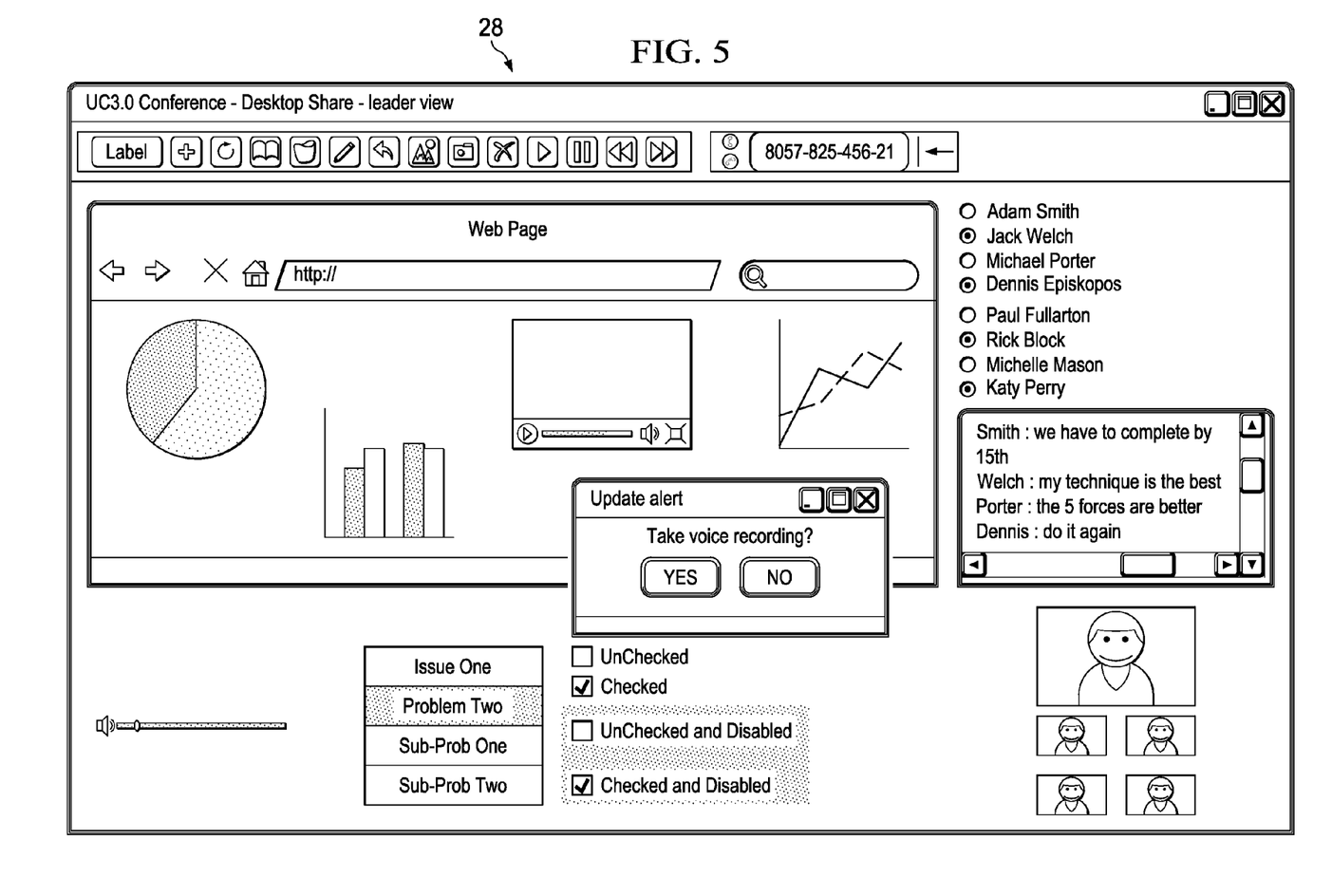
FIG. 5 illustrates a graphical user interface (GUI) prompting the participant who is the leader of the meeting to determine if a snapshot of the screen and text is desired.
Figure 6:
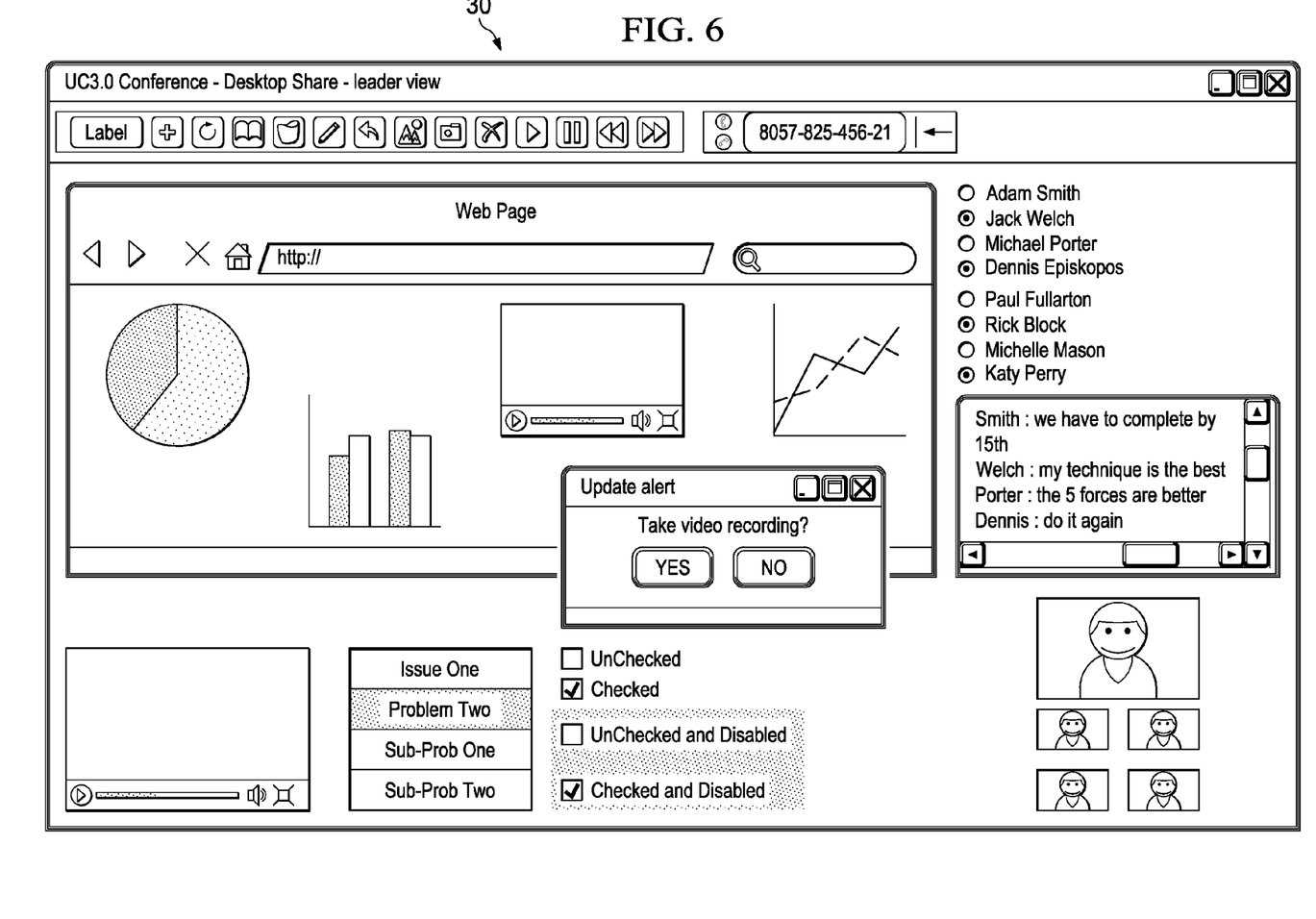
FIG. 6 illustrates a graphical user interface (GUI) prompting the participant who is the leader of the meeting to determine if a voice recording snapshot is desired.

Referring now to FIG. 5, a graphical user interface (GUI) 28 is shown prompting the participant 12 who is the leader of the meeting to determine if a voice recording snapshot (i.e., audio) is desired. Referring now to FIG. 30, a graphical user interface (GUI) 30 is shown prompting the participant 12 who is the leader of the meeting to determine if a video recording snapshot is desired. If the leader participant 12 decides to capture this video or voice data, the data is saved at the database 16 for future review by late-arriving participants 12.

Notably, instead of the leader participant 12 being prompted to save data corresponding to indicators for predetermined or selected topics, the database 16 of FIGS. 1-2 may automatically save such data. In an embodiment, the database 16 may begin to save such data in response to encountering one of the indicators. Thereafter, the database 16 may prompt the leader participant 12 to determine if the leader participant 12 would like to keep the data, delete the data, suspend recording of the data, and so on.

In addition, in a circumstance where the late-arriving participant 12 is using a device without, for example, video capability to participate in the meeting being held by video conference, the late-arriving participant 12 may be prompted to advise where video updates may be delivered. For instance, the late-arriving participant 12 using a phone without data capabilities or a display appropriate for video may indicate that all video updates should be delivered via text so that the late-arriving participant 12 can listed to the audio portion thereof, be delivered via e-mail so that the late-arriving participant 12 can access the data on another device (e.g., a computer, etc.) as the meeting continues, and so on.

Figure 7:
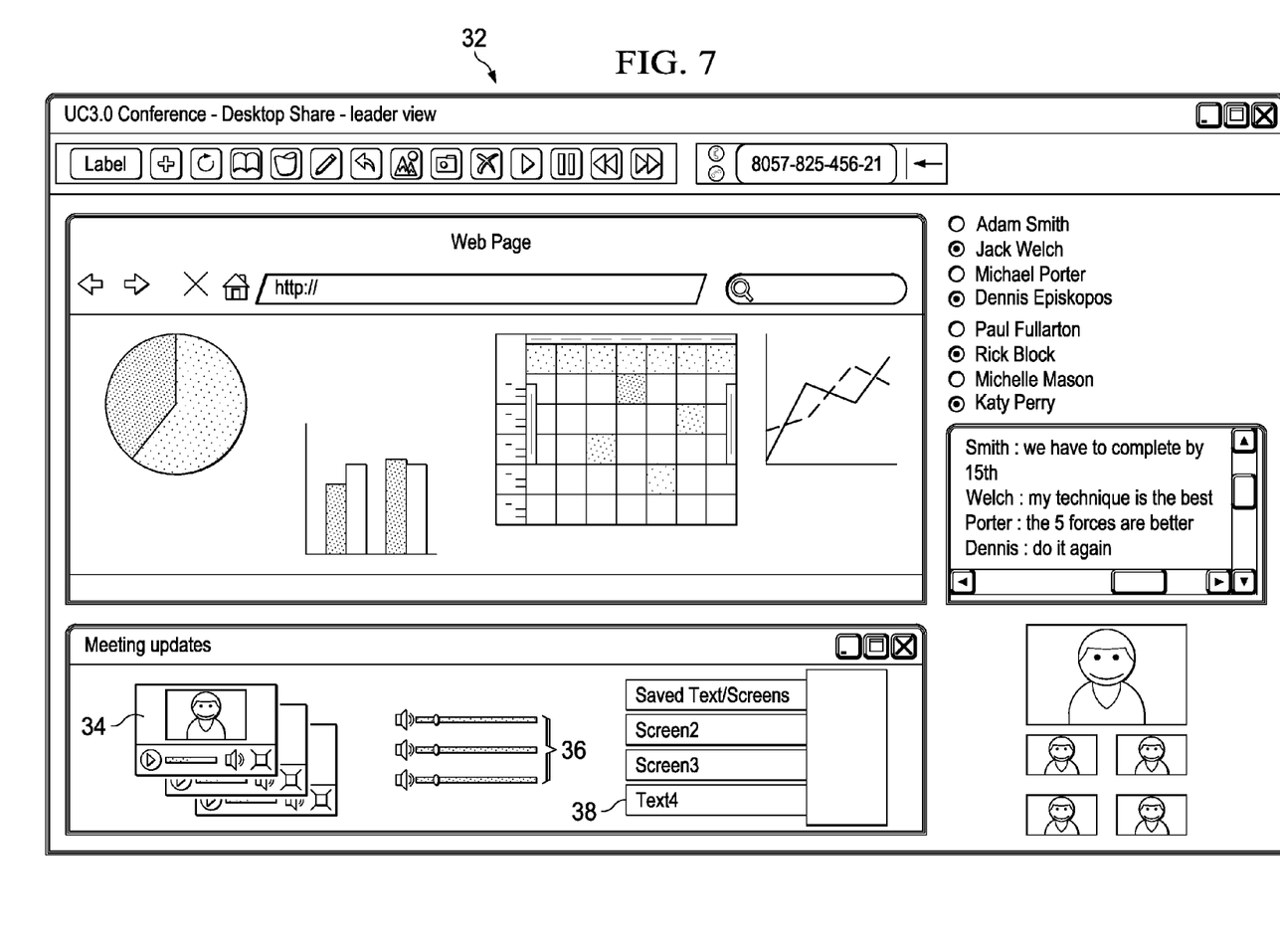
FIG. 7 illustrates a graphical user interface (GUI) displayed to the late-arriving participant is illustrated.

Referring now to FIG. 7, a graphical user interface (GUI) 32 displayed to the late-arriving participant 12 is illustrated. As shown, the graphical user interface (GUI) 32 offers the late-arriving participant 12 access to, for example, video updates 34, audio updates 36, and text and/or screen capture (e.g., visual) updates 38 stored before the late-arriving participant 12 joined the meeting. These updates can all be access by the late-arriving participant 12 while the meeting continues for the other participants. As such, the meeting does not need to be halted or suffer an interruption while the late-arriving participant 12 reviews the various saved data.

Figure 8:
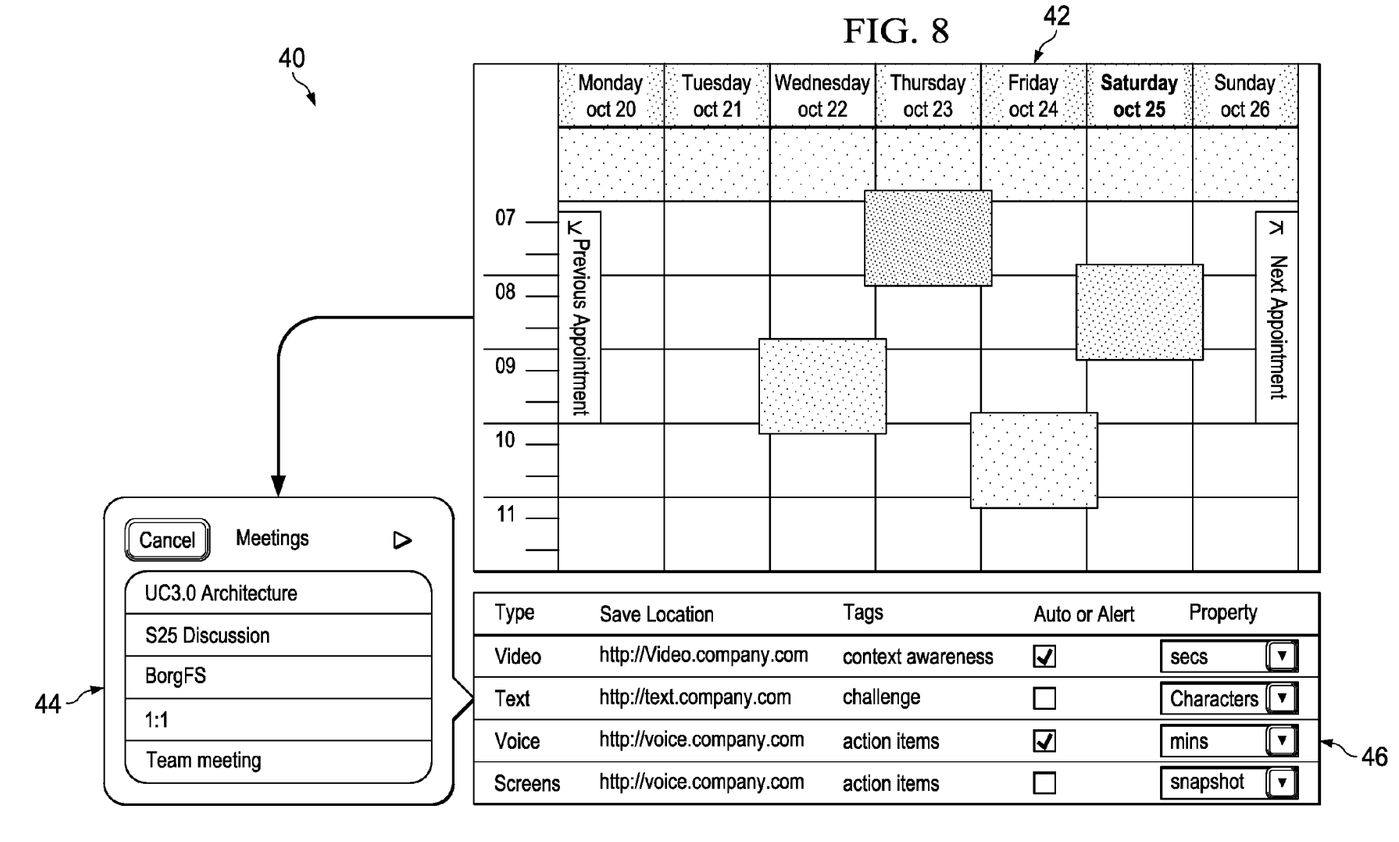
FIG. 8 illustrates potential configuration settings for the participant who is the leader (or other meeting scheduler)

Referring now to FIG. 8, potential configuration settings 40 for the participant 12 who is the leader (or other meeting scheduler) are illustrated. As shown, the potential configuration settings 40 include a calendar 42 to schedule meetings and a list of meetings 44. For each meeting in the list of meetings 44, an interface 46 may be used to indicate the settings for each type of data (e.g., video, text, voice, screens) to be captured during the meeting for the benefit of any late-arriving participants 12, which captured data will be fed to the late-arriving participant 12 as a meeting update.

For example, as shown in FIG. 8 a video that includes certain indicators (e.g., the phrase "context awareness," the phrase "action items," etc.) might have a certain save location (e.g., http://video.company.com) and will be saved automatically by the database 16 for a certain number of seconds. Similarly, the text that includes certain indicators (e.g., the word "challenge") might have a different save location (e.g., http://text.company.com) and be saved manually by the leader participant 12 upon being alerted and for a certain number of cleartext characters. It should be recognized that other configuration settings are contemplated herein.

Figure 9:
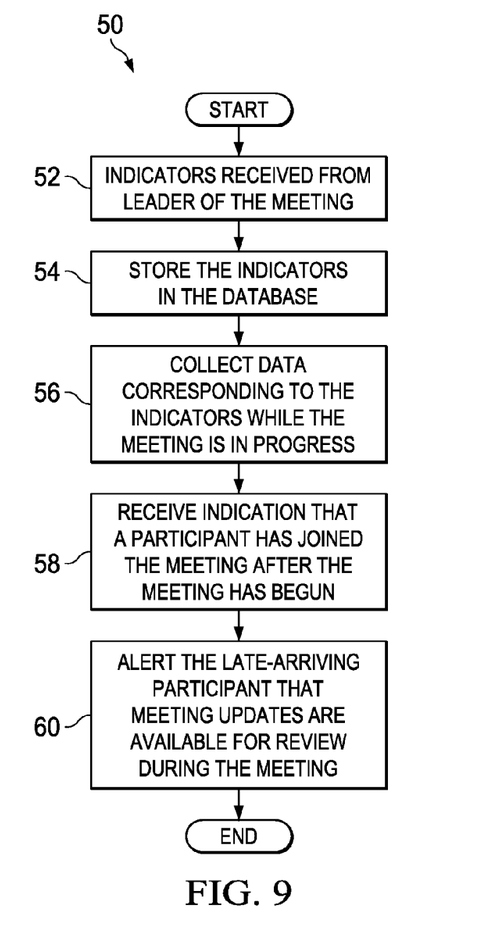
FIG. 9 illustrates an embodiment an embodiment method of disseminating updates in a real-time communications system of FIG. 1.

Referring now to FIG. 9, an embodiment method 50 of disseminating updates in a real-time communications system 10 is illustrated. In block 52, indicators are received at the database 16 from the leader of a meeting. The indicators pertain to predetermined topics to be discussed during the meeting. In block 54, the indicators received from the leader of the meeting are stored in the database 16.

In block 56, data from the meeting corresponding to the indicators is collected while the meeting is in progress. In block 58, an indication that participant has joined the meeting after the meeting has begun is received at the database 16. In block 60, the database alerts the late-arriving participant 12 that the data that was collected before the participant joined the meeting is available to the participant for review during the meeting. In an embodiment, that update data is send to the late-arriving participant for review during the meeting.

Figure 10:
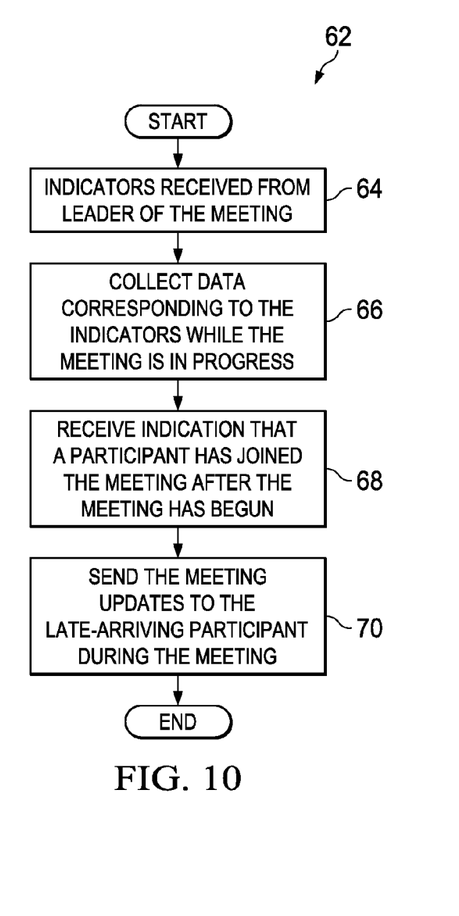
FIG. 10 illustrates an embodiment an embodiment method of disseminating updates in a real-time communications system of FIG. 1.

Referring now to FIG. 10, an embodiment method 62 of disseminating updates in a real-time communications system 10 is illustrated. In block 64, indicators pertaining to predetermined topics to be discussed during the meeting are received from the leader of the meeting prior to the meeting starting. In block 66, data from the meeting corresponding to the indicators is collected while the meeting is in progress. In block 68, an indication that participant has joined the meeting after the meeting has begun is received at the database 16.

In block 70, the database 16 sends or transmits the data from the meeting that was collected before the participant joined the meeting for review during the meeting. The data collected may have been generated by the leader participant 12, a timely-arriving participant 12, a previous late-arriving participant 12, and so on.

As noted above, when the embodiment real-time communications system 10 is in use, the participant 12 denoted as the leader supplies indicators to the database 16. In an embodiment, the indicators pertain to predetermined topics to be discussed during the meeting. The indicators may be one or more single key words (e.g., sales, profits, fiscal, etc.) or key words organized into a phrase or sentence (e.g., third quarter, budgetary concerns, etc.). In an embodiment, the indicators may also be a combination of words identified by Boolean or other parameters (e.g., fiscal AND 2013, the word "inventory" within the same paragraph as the word "current," the phrase "sales goals" mentioned within five seconds of "team three," etc.). As used herein, the indicators may also include numbers (e.g., seven, twenty, 7, 20, etc.), symbols, characters, and so on (e.g., copyright, ©, dollar, $, etc.) in different formats. In an embodiment, the indicators are one or more of the participants 12, another person's name, a picture or graphic, a slide from a presentation, and so on.

Despite the example graphic user interfaces discussed above, the concept disclosed herein is also applicable to more than video conferencing. For example, if a conventional phone system is properly equipped with the functionality described herein, the late-arriving participant 12 may hear a beep, be shown a visual signal, and so on to alert that late-arriving participant that updates are available for review in real-time while the meeting continues. Indeed, the late-arriving participant could begin listening to the updates when the meeting has moved to something other than the topics or subject matter relevant to the late-arriving participant 12. When that occurs, the microphone of the late-arriving participant 12 may be muted so as not to disturb the other meeting participants 12.

Figure 11:
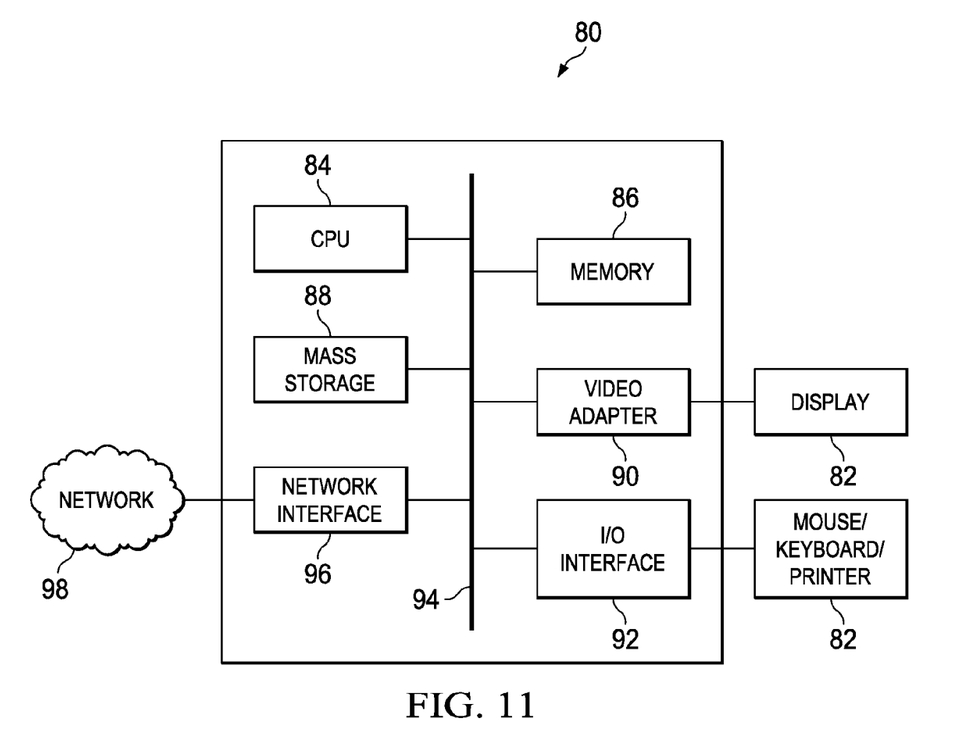
FIG. 11 is a block diagram illustrating a computing platform that may be used for implementing, for example, the devices and methods described herein, in accordance with an embodiment.

FIG. 11 is a block diagram of a processing system 80 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 80 may comprise a processing unit equipped with one or more input/output devices 82, such as a speaker, microphone, mouse, touchscreen, keypad, keyboard, printer, display, and the like. The processing system 80 may include a central processing unit (CPU) 84, memory 86, a mass storage device 88, a video adapter 90, and an I/O interface 92 connected to a bus 94.

The bus 94 may be one or more of any type of several bus architectures including a memory bus or memory controller, a peripheral bus, video bus, or the like. The CPU 84 may comprise any type of electronic data processor (e.g., processor 64 of FIG. 6 or processor 74 of FIG. 7). The memory 86 may comprise any type of system memory such as static random access memory (SRAM), dynamic random access memory (DRAM), synchronous DRAM (SDRAM), read-only memory (ROM), a combination thereof, or the like. In an embodiment, the memory 86 may include ROM for use at boot-up, and DRAM for program and data storage for use while executing programs.

The mass storage 88 device may comprise any type of storage device configured to store data, programs, and other information and to make the data, programs, and other information accessible via the bus 94. The mass storage device 88 may comprise, for example, one or more of a solid state drive, hard disk drive, a magnetic disk drive, an optical disk drive, or the like.

The video adapter 90 and the I/O interface 92 provide interfaces to couple external input and output devices to the processing unit. As illustrated, examples of input and output devices include the display coupled to the video adapter 90 and the mouse/keyboard/printer coupled to the I/O interface 92. Other devices may be coupled to the processing system 80, and additional or fewer interface cards may be utilized. For example, a serial interface such as Universal Serial Bus (USB) (not shown) may be used to provide an interface for a printer.

The processing system 80 also includes one or more network interfaces 96, which may comprise wired links, such as an Ethernet cable or the like, and/or wireless links to access nodes or different networks. The network interface 96 allows the processing system 80 to communicate with remote systems or units via the networks. For example, the network interface 96 may provide wireless communication via one or more transmitters/transmit antennas and one or more receivers/receive antennas. In an embodiment, the processing system 80 (a.k.a., processing unit) is coupled to a local-area network 98 or a wide-area network 98 for data processing and communications with remote devices, such as other processing units, the Internet, remote storage facilities, or the like.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of disseminating updates in a real-time communications system, the method comprising:
    storing, in a database, indicators received from a leader of a meeting, the indicators pertaining to predetermined topics to be discussed during the meeting;
    collecting, in the database, data automatically from the meeting in accordance with the indicators while the meeting is in progress;
    receiving, at the database, a message indicating whether to suspend collecting data;
    suspending collecting the data when the message indicates to suspend recording data;
    receiving, at the database, an indication that a participant has joined the meeting after the meeting has begun; and
    alerting, by the database, the participant that the data that was collected before the participant joined the meeting is available to the participant for review during the meeting.

2. The method of claim 1, further comprising receiving, from the leader, indicators pertaining to the predetermined topics to be discussed during the meeting prior to the meeting starting.

3. The method of claim 1, further comprising receiving the indication at the database during the meeting.

4. The method of claim 1, wherein the data is one or more snapshots of a screen.

5. The method of claim 1, wherein the data is at least one of a chat log and an instant message log.

6. The method of claim 1, further comprising conducting the meeting by video conference.

7. The method of claim 1, further comprising conducting the meeting by phone conference.

8. The method of claim 1, further comprising conducting the meeting by web conference.

9. The method of claim 1, further comprising conducting the meeting using at least one of chat and instant messaging.

10. The method of claim 1, further comprising presenting the participant with the data that was collected before the participant joined the meeting using a graphical user interface.

11. The method of claim 1, wherein collecting the data comprises:
    storing a first video in a first location in accordance with a first indicator of the first video; and
    storing a second video in a second location in accordance with a second indicator of the second video.

12. The method of claim 1, further comprising:
    receiving, at the database, a message indicating to delete the data; and
    deleting the data in accordance with the message.

13. A method of disseminating updates in a real-time communications system, comprising:
    receiving, from a leader of a meeting, indicators pertaining to predetermined topics to be discussed during the meeting prior to the meeting starting;
    collecting, in a database, data automatically from the meeting in accordance with the indicators while the meeting is in progress;
    receiving, at the database, a message indicating whether to suspend collecting data;
    suspending collecting the data when the message indicates to suspend recording data;
    receiving, at the database, an indication that a late-arriving participant has joined the meeting after the meeting has begun; and
    sending, to the late-arriving participant, the data from the meeting that was collected before the late-arriving participant joined the meeting for review by the late-arriving participant during the meeting.

14. The method of claim 13, wherein the data from the meeting that was collected before the late-arriving participant joined the meeting was generated by the leader of the meeting.

15. The method of claim 13, wherein the data from the meeting that was collected before the late-arriving participant joined the meeting was generated by a timely-arriving participant of the meeting.

16. The method of claim 13, wherein the data is one or more snapshots of a screen.

17. The method of claim 13, wherein the data is at least one of a chat log and an instant message log.

18. The method of claim 13, further comprising manually collecting the data before the late-arriving participant has joined the meeting.

19. The method of claim 13, further comprising conducting the meeting by at least one of video conference, web conference, and instant messaging.

20. The method of claim 13, further comprising presenting the participant with the data that was collected before the participant joined the meeting using a graphical user interface.

21. The method of claim 13, further comprising:
    storing a first video in a first location in accordance with a first indicator of the first video; and
    storing a second video in a second location in accordance with a second indicator of the second video.

22. An apparatus comprising:
    a processor; and
    a non-transitory computer readable storage medium storing programming for execution by the processor, the programming including instructions to receive indicators from a leader of a meeting, the indicators pertaining to predetermined topics to be discussed during the meeting, store the indicators and collect data automatically from the meeting in accordance with the indicators while the meeting is in progress, receive a message indicating whether to suspend collecting data, suspend the instructions to collect the data when the message indicates to suspend recording data, and alert a late-arriving participant that the data that was collected before the late-arriving participant joined the meeting is available to the late-arriving participant for review during the meeting.

23. The apparatus of claim 22, wherein the programming further includes instructions to transmit the data that was collected before the late-arriving participant joined the meeting to the late-arriving participant upon request from the late-arriving participant.

24. The apparatus of claim 22, wherein the programming further includes instructions to transmit the data that was collected before the late-arriving participant joined the meeting to the late-arriving participant upon request from the leader.

25. The apparatus of claim 22, wherein the programming further includes instructions to transmit the data that was collected before the late-arriving participant joined the meeting to the late-arriving participant automatically when the late arriving participant joins the meeting.

* * * * *